United States Patent
Lee et al.

(10) Patent No.: US 11,710,591 B2
(45) Date of Patent: Jul. 25, 2023

(54) SOLENOID ACTUATOR

(71) Applicant: UNICK CORPORATION, Gyeongsangnam-do (KR)

(72) Inventors: Chang-Hoon Lee, Gyeongsangnam-do (KR); Eui-Dong Roh, Gyeongsangnam-do (KR); Chan-Shik Ahn, Gyeongsangnam-do (KR); Bong-Ki Choi, Gyeongsangnam-do (KR); Ji-Hoon Park, Gyeongsangnam-do (KR); Jeong-Hyun Seo, Gyeongsangnam-do (KR)

(73) Assignee: UNICK CORPORATION, Gyeongsangnam-do (KR)

( * ) Notice: Subject to any disclaimer, the term of this patent is extended or adjusted under 35 U.S.C. 154(b) by 0 days.

(21) Appl. No.: 17/452,371

(22) Filed: Oct. 26, 2021

(65) Prior Publication Data

US 2022/0148782 A1    May 12, 2022

(30) Foreign Application Priority Data

Nov. 6, 2020    (KR) ......................... 10-2020-0147663

(51) Int. Cl.
*H01F 7/128*    (2006.01)
*F16K 27/02*    (2006.01)
(Continued)

(52) U.S. Cl.
CPC ........... *H01F 7/081* (2013.01); *F16K 27/029* (2013.01); *H01F 7/126* (2013.01); *H01F 7/128* (2013.01); *F16K 31/06* (2013.01)

(58) Field of Classification Search
CPC ........ F16K 27/029; F16K 27/12; F16K 31/06; F16K 31/0655; F16K 31/0675;
(Continued)

(56) References Cited

U.S. PATENT DOCUMENTS 2,458,123 A * 1/1949 Wasserlein .......... F16K 31/0655
335/262
5,620,019 A * 4/1997 Nicolaisen ................ H01F 7/08
411/549
(Continued)

FOREIGN PATENT DOCUMENTS

DE    102007013877 A1 * 10/2008 ......... F16K 31/0675
DE    102007013877 A1    10/2008
(Continued)

OTHER PUBLICATIONS

Extended European Search Report dated Apr. 4, 2022, for corresponding European Application No. 21204802.9.

*Primary Examiner* — Matthew W Jellett
(74) *Attorney, Agent, or Firm* — Kinney & Lange, P.A.

(57) ABSTRACT

A solenoid actuator includes a casing body having a receiving space defined therein; a casing cover coupled to the casing body, wherein the casing cover includes a connector for transmission of power and signal; a bobbin assembly installed in the receiving space; a core coupled to and extending through the bobbin assembly, wherein the core has a working space defined therein; a housing surrounding a lower end of the core protruding out of the bobbin assembly; a plunger movably installed in the working space; and a rod coupled to and extending through the core, wherein the rod moves under movement of the plunger. The bobbin assembly includes a bobbin terminal, and the casing cover includes a connector terminal, wherein when the casing cover is coupled to the casing body, the connector terminal is connected to the bobbin terminal.

2 Claims, 4 Drawing Sheets

(51) Int. Cl.
  *H01F 7/08* (2006.01)
  *H01F 7/126* (2006.01)
  *F16K 31/06* (2006.01)

(58) Field of Classification Search
  CPC . H01F 5/04; H01F 7/081; H01F 7/126; H01F 7/128; H01F 7/127; H01F 7/1607; H01F 7/16; H01F 2007/062; H01F 27/325; Y10T 137/5987
  See application file for complete search history.

(56) References Cited

U.S. PATENT DOCUMENTS

| | | | | |
|---|---|---|---|---|
| 8,443,829 | B2 * | 5/2013 | Czimmek | F02B 37/16 137/316 |
| 9,016,663 | B2 * | 4/2015 | Moreno | F16K 31/0675 251/129.15 |
| 9,184,524 | B2 * | 11/2015 | Tomita | F16K 31/0675 |
| 9,631,736 | B2 * | 4/2017 | Kus | F16K 31/0651 |
| 10,087,901 | B2 * | 10/2018 | Marechal | F16K 27/029 |
| 10,139,006 | B2 * | 11/2018 | Muraoka | H01F 7/126 |
| 10,155,126 | B2 * | 12/2018 | Schwobe | F16K 31/0675 |
| 10,371,278 | B2 * | 8/2019 | Pellmann | F16K 27/029 |
| 10,408,361 | B2 * | 9/2019 | Jin | F16K 31/1635 |
| 2006/0243938 | A1 | 11/2006 | Ishibashi et al. | |
| 2009/0130868 | A1 | 5/2009 | Schenk et al. | |
| 2013/0302545 | A1 * | 11/2013 | Schnelker | F16K 27/029 219/121.64 |
| 2017/0370495 | A1 | 12/2017 | Markley et al. | |
| 2020/0114479 | A1 * | 4/2020 | Ueno | F16K 31/0613 |

FOREIGN PATENT DOCUMENTS

| | | |
|---|---|---|
| DE | 102008012781 A1 | 9/2009 |
| JP | H08-247324 A | 9/1996 |
| JP | 2019148314 A | 9/2019 |
| KR | 20040054889 A | 6/2004 |
| KR | 20140123128 A | 10/2014 |
| KR | 20150043056 A | 4/2015 |
| KR | 102040860 B1 | 11/2019 |

* cited by examiner

SOLENOID ACTUATOR

CROSS-REFERENCE TO RELATED APPLICATION

This application claims the benefit under 35 U.S.C. 119(a) of Korean Patent Application No. 10-2020-0147663 filed on Nov. 6, 2020, the entire disclosure of which is incorporated herein by reference for all purposes.

BACKGROUND

1. Technical Field

The present disclosure relates to a solenoid actuator, and more particularly, to a solenoid actuator installed in an engine and a powertrain of a vehicle to act as a valve to regulate flow of fluid such as fuel and oil or to control a pressure.

2. Description of Related Art

In general, a solenoid actuator is installed in a power train including an automobile engine to control flow of fluid such as fuel, coolant, and oil, or to regulate fluid pressure.

For example, in a fuel system, the solenoid actuator controls supply and injection of fuel. In a cooling system, the solenoid actuator controls circulation of lubricant and coolant. Further, in a power transmission system, a solenoid actuator controls operation of a friction element such as a clutch by adjusting a pressure of the fluid to realize various shift stages.

Korean Patent No. 10-2040860 (2019.10.30) discloses a solenoid actuator.

The solenoid actuator includes a casing in which components such as a bobbin assembly are accommodated. In this connection, the casing is composed of a casing body having at least one open end, and a casing cover coupled to the open end of the casing body.

The casing cover is formed in a cup shape to cover the open end of the casing body, and has a connector for supplying power and a signal at one side thereof.

Further, a hole into which a mount of the bobbin assembly is inserted is formed in the casing cover. A terminal for connecting the bobbin assembly and the connector to each other is located in the hole. In this connection, the hole is open to an outside so that soldering may be performed when the bobbin assembly and the connector are connected to each other.

The conventional solenoid actuator as described above has a very cumbersome assembly operation because it is necessary to solder the terminal when connecting the bobbin assembly and the connector to each other. In particular, after the bobbin assembly and the connector are connected to each other, the hole is filled with resin and is sealed. Thus, there is a problem in that airtightness is deteriorated.

Further, because the casing body and the casing cover are coupled to each other using a protrusion and a groove, there is a risk that the casing cover may be removed from the casing body when the connector is deformed due to heat generated when power is applied.

PRIOR ART LITERATURE

Patent Literature

Patent Document 1: Korean Patent No. 10-2040860 (2019.10.30.).

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter.

The present disclosure is intended to solve the problems of the prior art as described above. Thus, a purpose of the present disclosure is to provide a solenoid actuator in which it may be easy to connect a terminal for connection of a bobbin assembly and a terminal for connection of a connector to each other, and airtightness of the casing may be improved.

In addition, a purpose of the present disclosure is to provide a solenoid actuator that may prevent deformation of the casing cover due to heat generated from the connector when power is applied, and thus may prevent removal of the components accommodated in the casing body therefrom.

Purposes in accordance with the present disclosure are not limited to the above-mentioned purpose. Other purposes and advantages in accordance with the present disclosure as not mentioned above may be understood from following descriptions and more clearly understood from embodiments in accordance with the present disclosure. Further, it will be readily appreciated that the purposes and advantages in accordance with the present disclosure may be realized by features and combinations thereof as disclosed in the claims.

A solenoid actuator comprises a casing body having a receiving space defined therein; a casing cover coupled to the casing body, wherein the casing cover includes a connector for transmission of power and signal; a bobbin assembly installed in the receiving space; a core coupled to and extending through the bobbin assembly, wherein the core has a working space defined therein; a housing surrounding a lower end of the core protruding out of the bobbin assembly; a plunger movably installed in the working space; and a rod coupled to and extending through the core, wherein the rod moves under movement of the plunger, wherein the bobbin assembly includes a bobbin terminal, and the casing cover includes a connector terminal, wherein when the casing cover is coupled to the casing body, the connector terminal is connected to the bobbin terminal.

In one implementation, one of the bobbin terminal and the connector terminal is embodied as a pin terminal, while the other thereof is embodied as a fork terminal.

In one implementation, the connector terminal includes a pair of connector terminals, wherein the pair of connector terminals are spaced from each other by a spacer.

In one implementation, the bobbin assembly includes a spool-shaped bobbin, and a coil wound around an outer circumferential face of the bobbin.

In one implementation, a mount protrudes from a bottom face of the bobbin, and the mount has the connector terminal, wherein the housing has a first groove defined therein into which the mount and the bobbin terminal are inserted.

In one implementation, the mount has a guide groove defined therein into which the coil connected to the connector terminal is inserted.

In one implementation, an insulating groove is formed in one side of the housing in which the first groove is formed, wherein the insulating groove spaces the casing body and the bobbin terminal from each other.

In one implementation, a first embossing to prevent radial movement of the bobbin assembly protrudes from at least one of a top and a bottom of an outer circumferential face of the bobbin, wherein a second embossing to prevent axial movement of the bobbin assembly protrudes from at least one of a top face and a bottom face of the bobbin.

In one implementation, the casing body has a pipe shape having an open top face and an open bottom face, wherein the casing cover has a cup shape surrounding a lower portion of the casing body, wherein a groove is formed in an outer circumferential face of the casing body and a protrusion is formed on an inner circumferential face of the casing cover, wherein when the casing body and the casing cover are coupled to each other, the protrusion is inserted into the groove such that the casing body and the casing cover are provisionally fastened to each other, wherein a screw completely fixes the casing body and the casing cover provisionally fastened to each other to each other.

In one implementation, a further groove is formed in the outer circumferential face of the casing body, wherein an O-ring sealing between the casing body and the casing cover is inserted into the further groove, wherein the further groove is positioned above the groove in an assembly direction of the casing cover.

In one implementation, the solenoid actuator further comprises a screw passing through the casing cover and screw-coupled to the housing.

In one implementation, the solenoid actuator further comprises deformation prevention means disposed between the bobbin assembly and the core, wherein the deformation prevention means prevents deformation and movement of the components housed in the casing body.

Because the solenoid actuator configured as described above according to the present disclosure has a structure in which the bobbin terminal and the connector terminal disposed in the bobbin assembly and the casing cover, respectively, are connected to each other when the casing cover is coupled to the casing body, connection between the terminal for the connection of the bobbin assembly and the terminal for the connection of the connector may be easy.

Further, the solenoid actuator according to the present disclosure may improve the tightness of the casing cover because no holes are required for soldering of the bobbin terminal and the connector terminal.

Further, in the solenoid actuator according to the present disclosure, the casing body and the casing cover are coupled and fixed to each other via the screw, thereby preventing the casing cover from being deformed due to the heat generated from the connector when power is applied, and thus preventing the components housed in the casing body from being removed therefrom.

In addition to the effects as described above, specific effects in accordance with the present disclosure will be described together with following detailed descriptions for carrying out the disclosure.

DETAILED DESCRIPTION

Figure 1:
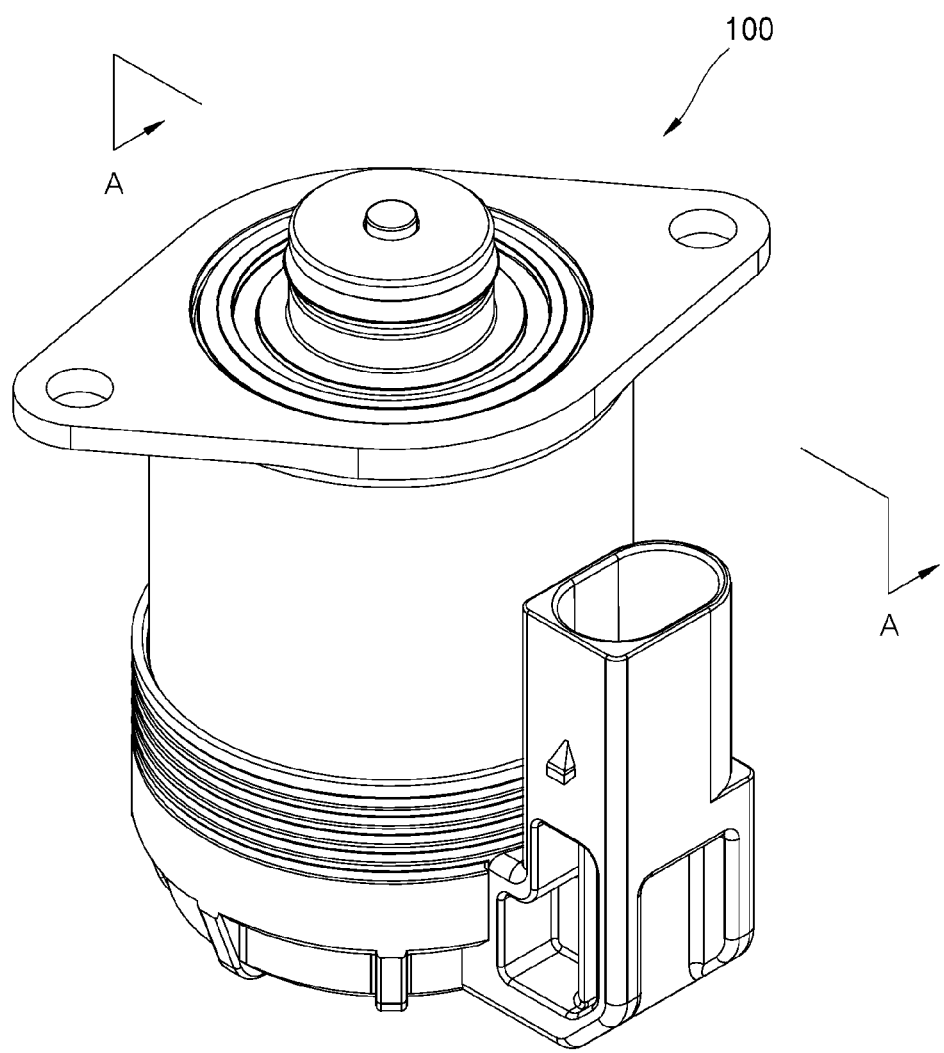
FIG. 1 is a perspective view of a solenoid actuator according to an embodiment of the present disclosure.

For simplicity and clarity of illustration, elements in the figures are not necessarily drawn to scale. The same reference numbers in different figures represent the same or similar elements, and as such perform similar functionality. Further, descriptions and details of well-known steps and elements are omitted for simplicity of the description. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

Examples of various embodiments are illustrated and described further below. It will be understood that the description herein is not intended to limit the claims to the specific embodiments described. On the contrary, it is intended to cover alternatives, modifications, and equivalents as may be included within the spirit and scope of the present disclosure as defined by the appended claims.

The terminology used herein is for the purpose of describing particular embodiments only and is not intended to limit the present disclosure. As used herein, the singular forms "a" and "an" are intended to include the plural forms as well, unless the context clearly indicates otherwise. It will be further understood that the terms "comprises", "comprising", "includes", and "including" when used in this specification, specify the presence of the stated features, integers, operations, elements, and/or components, but do not preclude the presence or addition of one or more other features, integers, operations, elements, components, and/or portions thereof. As used herein, the term "and/or" includes any and all combinations of one or more of the associated listed items. Expression such as "at least one of" when preceding a list of elements may modify the entirety of list of elements and may not modify the individual elements of the list. When referring to "C to D", this means C inclusive to D inclusive unless otherwise specified.

In addition, it will also be understood that when a first element or layer is referred to as being present "on" or "beneath" a second element or layer, the first element may be disposed directly on or beneath the second element or may be disposed indirectly on or beneath the second element with a third element or layer being disposed between the first and second elements or layers.

It will be understood that when an element or layer is referred to as being "connected to", or "coupled to" another element or layer, it may be directly on, connected to, or coupled to the other element or layer, or one or more intervening elements or layers may be present. In addition, it will also be understood that when an element or layer is referred to as being "between" two elements or layers, it may be the only element or layer between the two elements or layers, or one or more intervening elements or layers may also be present.

Further, as used herein, when a layer, film, region, plate, or the like is disposed "on" or "on a top" of another layer, film, region, plate, or the like, the former may directly contact the latter or still another layer, film, region, plate, or the like may be disposed between the former and the latter. As used herein, when a layer, film, region, plate, or the like is directly disposed "on" or "on a top" of another layer, film, region, plate, or the like, the former directly contacts the latter and still another layer, film, region, plate, or the like is not disposed between the former and the latter. Further, as used herein, when a layer, film, region, plate, or the like is disposed "below" or "under" another layer, film, region, plate, or the like, the former may directly contact the latter or still another layer, film, region, plate, or the like may be disposed between the former and the latter. As used herein, when a layer, film, region, plate, or the like is directly disposed "below" or "under" another layer, film, region, plate, or the like, the former directly contacts the latter and still another layer, film, region, plate, or the like is not disposed between the former and the latter.

Unless otherwise defined, all terms including technical and scientific terms used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 2:
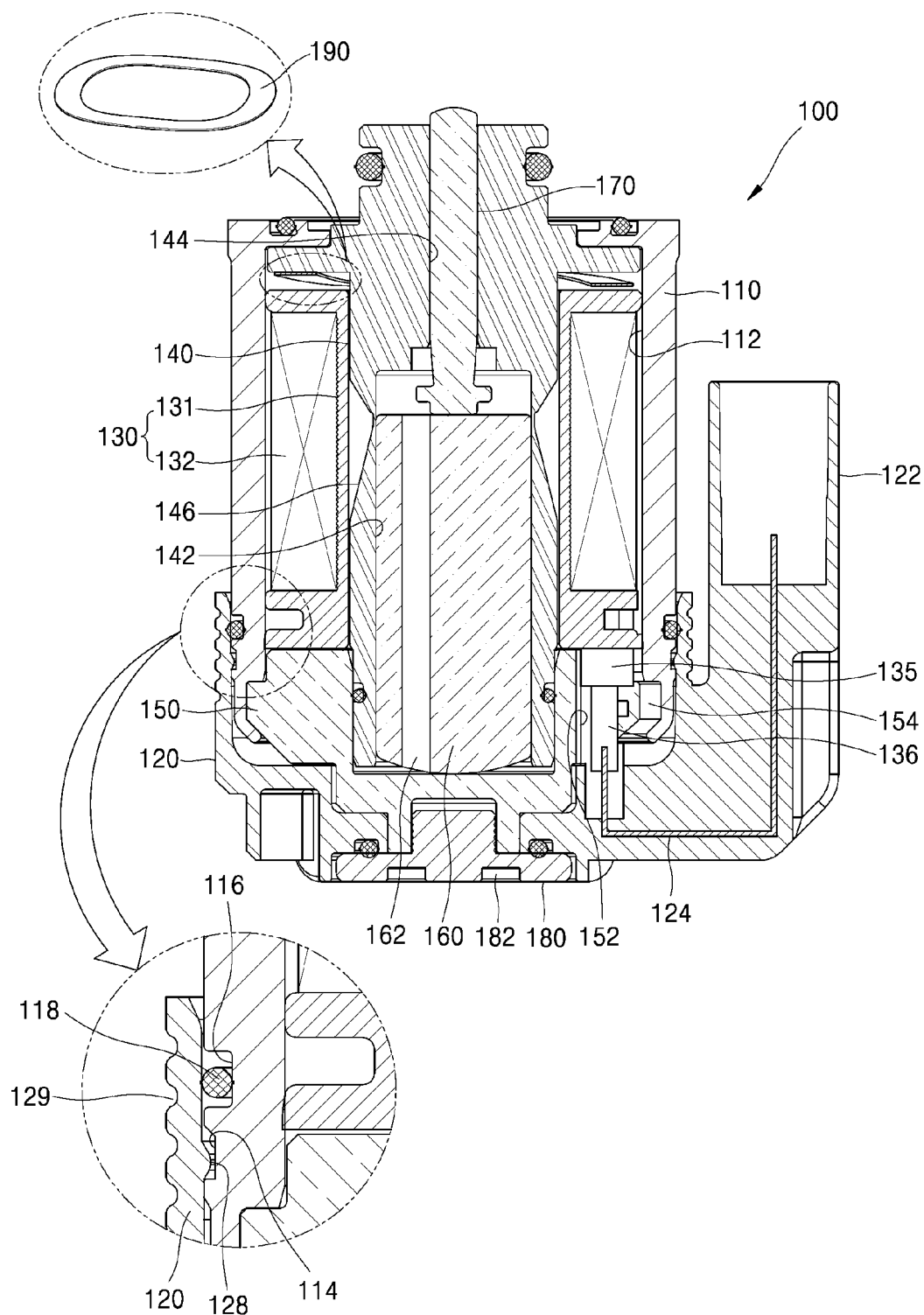
FIG. 2 is a cross-sectional view of a solenoid actuator according to an embodiment of the present disclosure.

As shown in FIG. 1 and FIG. 2, a solenoid actuator 100 according to an embodiment of the present disclosure includes a casing body 110, a casing cover 120 coupled to the casing body 110, a bobbin assembly 130 accommodated in the casing body 110, a core 140, a housing 150, a plunger 160, a rod 170, and a screw 180 for fixing the casing body 110 and the casing cover 120 to each other.

Figure 3:
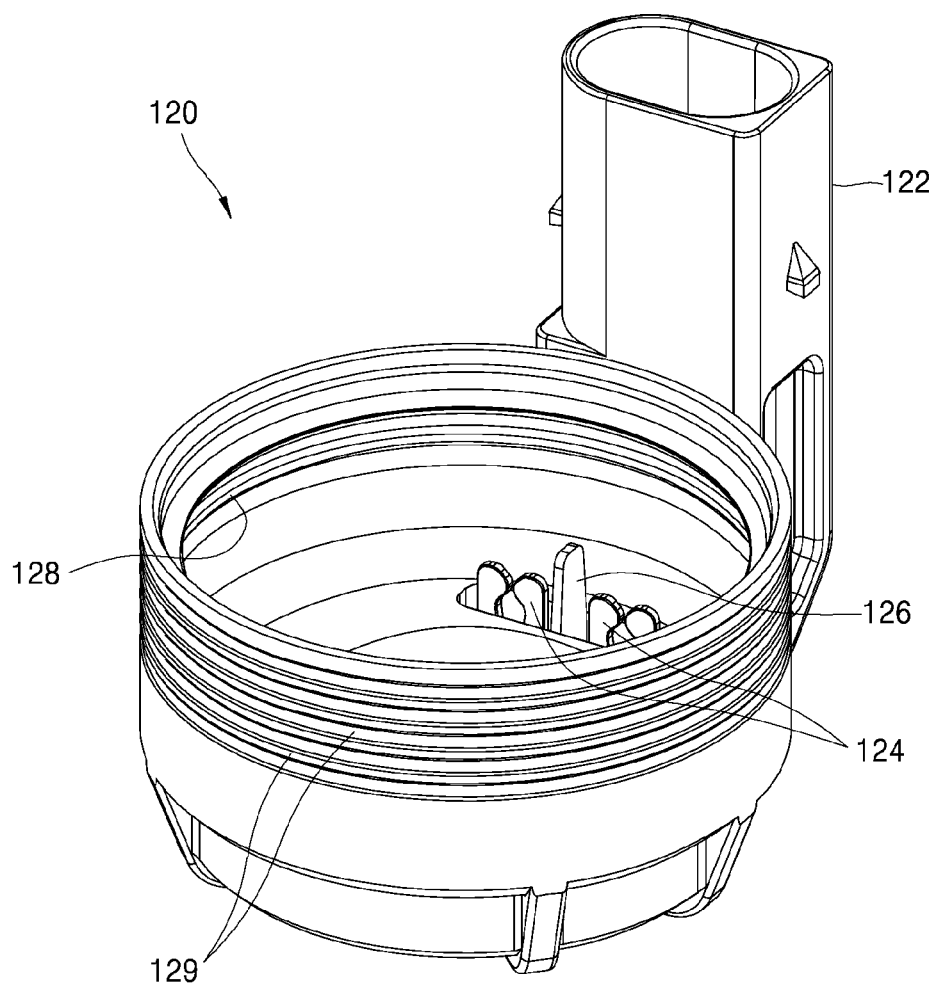
FIG. 3 is a view showing a casing cover of a solenoid actuator according to an embodiment of the present disclosure.
Figure 4:
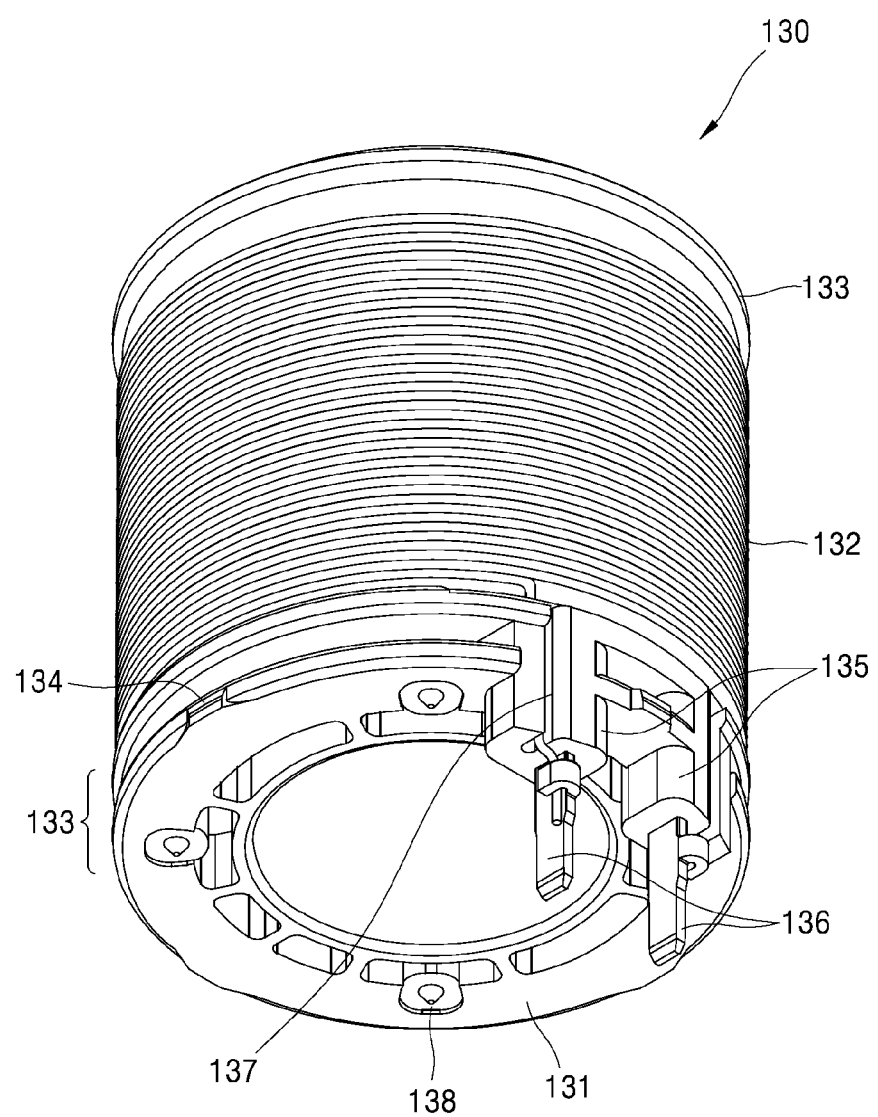
FIG. 4 is a view showing a bobbin assembly of a solenoid actuator according to an embodiment of the present disclosure.

With reference to FIG. 2 to FIG. 4, the components 110 to 180 constituting the solenoid actuator 100 according to this embodiment will be described in detail.

The casing body 110 has a pipe shape with an open top face and an open bottom face. A space 112 for accommodating the components 130 to 170 including the bobbin assembly 130 therein is formed inside the casing body 110.

The open top face and the open bottom face of the casing body 110 are respectively sealed by the core 140 and the housing 150. A lower end of the casing body 110 closed by the housing 150 is further sealed by the casing cover 120.

The casing cover 120 has a cup shape surrounding a lower portion of the casing body 110. A connector 122 for power and signal transmission is disposed at one side of the casing cover 120, and a connector terminal 124 is disposed in the connector 122.

The connector terminal 124 may be manufactured in a form of a fork terminal so that the connector terminal may be connected to the bobbin terminal 136 in a form of a pin terminal to be described later when the casing cover 120 is coupled to the casing body. In this connection, the connector terminal 124 may include a pair of connector terminals, and a spacer 126 is disposed between the pair of connector terminals 124 to prevent short circuit therebetween.

A first groove 114 is formed in an outer circumferential face of the casing body 110 and a first protrusion 128 is formed on an inner circumferential face of the casing cover 120. The first protrusion 128 is inserted into the first groove 114 when assembling the casing cover 120 and the casing body 110, thereby temporarily fastening the casing body 110 and the casing cover 120 to each other.

Further, a second groove 116 is formed in the outer circumferential face of the casing body 110, and an O-ring 118 sealing a gap between the casing body 110 and the casing cover 120 is inserted into the groove 116.

In this connection, the second groove 116 into which the O-ring 118 is inserted is located above the first groove 114 in the assembly direction of the casing cover 120. This is intended to prevent the O-ring 118 from being rubbed against an inner wall of the casing cover 120 in the process of assembling the casing cover 120 to the casing body.

Further, a plurality of corrugations 129 are formed on the outer circumferential face of the casing cover 120. The corrugation 129 refers to means for imparting elasticity to the casing cover 120, and allows the casing cover 120 to be expanded when assembling the casing cover with the casing body 110, so that the casing cover and the casing body may be easily assembled with each other.

Further, the casing body 110 and the casing cover 120 temporarily fastened to each other via the first protrusion 128 and the first groove 114 are completely fastened to each other via a screw 180 that passes through the casing cover 120 and is coupled to the housing 150. In this connection, the screw 180 is formed in a shape of a multi-step disk including a third groove 182 so that screwing-coupling and screwing-decoupling are achieved only with a specific tool.

When the casing body 110 and the casing cover 120 are manufactured separately in the above manner, a shape of the solenoid actuator 100 may be changed in various ways, and thus may be applied to various systems (layouts).

The bobbin assembly 130 is installed in the receiving space 112 of the casing body 110 to generate a magnetic field when power is applied thereto. The bobbin assembly 130 is composed of a bobbin 131 and a coil 132 wound around an outer circumferential face of the bobbin 131.

The bobbin 131 has a hollow spool shape so that the coil 132 is wound around the bobbin and the core 140 passes therethrough.

A flange 133 having a larger diameter than a middle of the bobbin is formed at each of a top and a bottom of the bobbin 131. A first embossing 134 that prevents radial movement of the bobbin assembly 130 protrudes from the outer circumferential face of the flange 133 at the bottom of the bobbin.

A mount 135 protrudes from the bottom face of the bobbin 131. A bobbin terminal 136 in a form of a pin terminal connected to the coil 132 protrudes from the mount 135. In this connection, a guide groove 137 into which the coil 132 is inserted is formed in the mount 135.

In one example, a second embossing 138 that prevents axial movement of the bobbin assembly 130 protrudes from the bottom face of the bobbin 131.

The core 140 is embodied as a fixed iron core that induces a magnetic field generated from the bobbin assembly 130. The core 140 has a cylindrical shape elongated in one direction, and extends through from a top of the bobbin assembly 130 to a bottom thereof.

The core 140 has a working space 142 defined therein for movement of the plunger 150 and a movement space 144 defined therein for movement of the rod 170. Further, in a middle portion of an outer circumferential face of the core 140, a tapered magnetic force reinforcing groove 146 for securing a magnetic force is formed.

The housing 150 has a disk shape having a predetermined thickness, and is installed to surround a lower end of the core 140 passing through the bobbin assembly 130 and protruding out of the bobbin assembly.

A fourth groove 152 into which the mount 135 and the bobbin terminal 136 are inserted, and an insulating groove 154 for spacing the casing body 110 and the bobbin terminal 136 from each other are formed in one side of the housing 150.

The plunger 160 is embodied as a movable iron core that moves under the magnetic field induced using the core 140, and is movably installed in the working space 142. This plunger 160 is formed in a cylindrical shape with a predefined length, and a channel 162 is formed inside the plunger 160.

When the channel 162 is formed in the plunger 160, a working resistance caused by oil filled in the working space 142 may be eliminated. In this connection, the channel 162 may be eccentric by a predefined distance from a center of the plunger 160, thereby preventing the channel 162 from being closed due to contact thereof with the rod 170.

The rod 170 is embodied as a round rod extending in one direction and is movably installed in the movement space 144 formed in the core 140. This rod 170 moves under the movement of the plunger 160, and is drawn out or drawn into the solenoid actuator 100.

The rod 170 according to this embodiment is formed in a tapered shape whose a diameter decreases as the rod extends toward a bottom thereof. Thus, a gap between the rod and a wall defining the movement space 144 is variable when the rod 170 moves. That is, when the rod 170 rises up maximally, the gap between the rod and the wall defining the movement space 144 becomes maximum. when the rod 170 descends maximally, the gap between the rod and the wall defining the movement space 144 becomes the minimum.

Therefore, when the power is applied and the rod 170 rises up, oil easily flows through the expanded movement space 144, so that lubricity may be improved.

In one example, deformation prevention means 190 is disposed between the bobbin assembly 130 and the core 140. The deformation prevention means 190 prevents the components such as the bobbin assembly 130 and the core 140 housed in the casing 110 from being deformed or moving due to an external force.

The deformation prevention means 190 according to this embodiment may be embodied as a wave washer having a valley and a peak formed along a perimeter thereof. When the washer is installed, the washer may apply a preload force in a longitudinal direction of the casing 110, thereby preventing the components from being deformed or moving due to an external force, and thus, preventing malfunction due to the deformation of the components.

Although the embodiments of the present disclosure have been described in more detail with reference to the accompanying drawings, the present disclosure is not necessarily limited to these embodiments. The present disclosure may be implemented in various modified manners within the scope not departing from the technical idea of the present disclosure. Accordingly, the embodiments disclosed in the present disclosure are not intended to limit the technical idea of the present disclosure, but to describe the present disclosure, the scope of the technical idea of the present disclosure is not limited by the embodiments. Therefore, it should be understood that the embodiments as described above are illustrative and non-limiting in all respects. The scope of protection of the present disclosure should be interpreted by the claims, and all technical ideas within the scope of the present disclosure should be interpreted as being included in the scope of the present disclosure.

What is claimed is:

1. A solenoid actuator comprising:
a casing body having a receiving space defined therein;
a casing cover coupled to the casing body, wherein the casing cover includes a connector for transmission of power and signals;
a bobbin assembly installed in the receiving space;
a core coupled to and extending through the bobbin assembly, wherein the core has a working space defined therein;
a housing surrounding a lower end of the core protruding out of the bobbin assembly;
a plunger movably installed in the working space; and
a rod coupled to and extending through the core, wherein the rod moves under movement of the plunger,
wherein the bobbin assembly includes a bobbin terminal, and the casing cover includes a connector terminal,
wherein when the casing cover is coupled to the casing body, the connector terminal is connected to the bobbin terminal,
wherein one of the bobbin terminal or the connector terminal is embodied as a pin terminal, while the other thereof is embodied as a fork terminal,
wherein the connector terminal includes a pair of connector terminals, wherein the pair of connector terminals are spaced from each other by a spacer,
wherein the bobbin assembly includes a spool-shaped bobbin, and a coil wound around an outer circumferential face of the spool-shaped bobbin,
wherein a mount protrudes from a bottom face of the spool-shaped bobbin, and the mount has the bobbin terminal,
wherein the housing has a first groove defined therein into which the mount and the bobbin terminal are inserted,
wherein the mount has a guide groove defined therein into which the coil connected to the bobbin terminal is inserted,
wherein an insulating groove is formed in one side of the housing in which the first groove is formed, wherein the insulating groove spaces the casing body and the bobbin terminal from each other,
wherein a first embossing to prevent radial movement of the bobbin assembly protrudes from at least one of a top or a bottom of the outer circumferential face of the spool-shaped bobbin,
wherein a second embossing to prevent axial movement of the bobbin assembly protrudes from at least one of a top face or the bottom face of the spool-shaped bobbin,
wherein the casing body has a pipe shape having an open top face and an open bottom face,
wherein the casing cover has a cup shape surrounding a lower portion of the casing body,
wherein a groove is formed in an outer circumferential face of the casing body and a protrusion is formed on an inner circumferential face of the casing cover,
wherein when the casing body and the casing cover are coupled to each other, the protrusion is inserted into the groove such that the casing body and the casing cover are provisionally fastened to each other,
wherein a screw completely fixes together the casing body and the casing cover that are provisionally fastened to each other,
wherein a further groove is formed in the outer circumferential face of the casing body, wherein an O-ring sealing between the casing body and the casing cover is inserted into the further groove,
wherein the further groove is positioned above the groove in an assembly direction of the casing cover, and
wherein the solenoid actuator further comprises a screw passing through the casing cover and screw-coupled to the housing.

2. The solenoid actuator of claim 1, wherein the solenoid actuator further comprises deformation prevention means disposed between the bobbin assembly and the core, wherein the deformation prevention means prevents deformation and movement of components housed in the casing body.

* * * * *